(12) United States Patent
Yablon

(10) Patent No.: US 9,191,506 B1
(45) Date of Patent: Nov. 17, 2015

(54) METHOD AND APPARATUS FOR CHANGING A TELEPHONE NUMBER AFTER ENTRY

(71) Applicant: Gilbert J. Yablon, Woodland Hills, CA (US)

(72) Inventor: Gilbert J. Yablon, Woodland Hills, CA (US)

( * ) Notice: Subject to any disclaimer, the term of this patent is extended or adjusted under 35 U.S.C. 154(b) by 0 days.

(21) Appl. No.: 14/289,358

(22) Filed: May 28, 2014

Related U.S. Application Data

(63) Continuation of application No. 13/588,087, filed on Aug. 17, 2012, now Pat. No. 8,744,066, which is a continuation of application No. 12/266,711, filed on Nov. 7, 2008, now Pat. No. 8,249,246.

(60) Provisional application No. 60/986,363, filed on Nov. 8, 2007.

(51) Int. Cl.
| | |
|---|---|
| *H04M 1/00* | (2006.01) |
| *H04M 3/00* | (2006.01) |
| *H04M 7/00* | (2006.01) |
| *H04M 3/44* | (2006.01) |
| *H04M 1/2745* | (2006.01) |

(52) U.S. Cl.
CPC .......... *H04M 3/44* (2013.01); *H04M 1/274566* (2013.01)

(58) Field of Classification Search
CPC ............ H04M 1/274566; H04M 3/44; H04M 1/274533; H04M 1/575
USPC .................. 379/355.06, 219, 355.01, 355.05, 379/355.07, 355.08, 220.01, 216.01, 379/207.11, 241
See application file for complete search history.

(56) References Cited

U.S. PATENT DOCUMENTS

| | | | |
|---|---|---|---|
| 5,157,719 | A | 10/1992 | Waldman |
| 5,280,516 | A | 1/1994 | Jang |
| 5,475,743 | A | 12/1995 | Nixon et al. |
| 5,509,056 | A | 4/1996 | Ericsson et al. |
| 5,524,146 | A | 6/1996 | Morrisey et al. |
| 5,768,358 | A | 6/1998 | Venier et al. |
| 5,859,901 | A | 1/1999 | Brendzel et al. |
| 5,917,902 | A | 6/1999 | Saucier |
| 5,946,390 | A | 8/1999 | Boakes |
| 6,061,443 | A | 5/2000 | Yablon |
| 6,134,319 | A | 10/2000 | Burg et al. |
| 6,298,131 | B1 | 10/2001 | Veschi |
| 6,343,125 | B1 | 1/2002 | Yablon |
| 6,345,095 | B1 | 2/2002 | Yamartino |
| 6,477,247 | B1 | 11/2002 | Burg et al. |
| 6,687,365 | B1 | 2/2004 | Yablon |

(Continued)

*Primary Examiner* — Thjuan K Addy
(74) *Attorney, Agent, or Firm* — Jay R. Yablon

(57) ABSTRACT

A computerized system and related method for assisting a user with placing a telephonic call, comprising a user interface, computerized processing, and computerized storage for: a user specifying an originally-specified telephone number to place an intended telephonic call, which telephone number, as originally-specified, for at least one particular reason, cannot be used to successfully complete the intended telephonic call; the user, after specifying the originally-specified telephone number, later specifying later-specified telephone number elements, including the possible deleting or ignoring of part of the originally-specified telephone number; and causing the telephonic call to be successfully signaled using the originally-specified telephone number in combination with the later-specified telephone number elements, without the user having to re-specify the originally-specified telephone number.

21 Claims, 1 Drawing Sheet

(56) References Cited

U.S. PATENT DOCUMENTS

| | | |
|---|---|---|
| 6,751,311 B1 | 6/2004 | Arnold et al. |
| 6,856,816 B2 | 2/2005 | Porter |
| 6,895,002 B2 * | 5/2005 | Shah et al. ............ 370/356 |
| 6,940,965 B1 | 9/2005 | Arnold et al. |
| 6,947,544 B2 | 9/2005 | Yamartino |
| 7,103,168 B2 * | 9/2006 | Bedingfield et al. ..... 379/216.01 |
| 7,697,678 B2 | 4/2010 | Yablon |
| 7,940,918 B1 | 5/2011 | Yablon |
| 8,249,246 B1 | 8/2012 | Yablon |
| 8,385,537 B1 | 2/2013 | Yablon |
| 8,744,066 B1 | 6/2014 | Yablon |
| 2003/0012359 A1 | 1/2003 | Nayhouse et al. |
| 2004/0136514 A1 | 7/2004 | Rambo |
| 2006/0002542 A1 | 1/2006 | Yamartino |
| 2006/0098799 A1 | 5/2006 | Yablon |

\* cited by examiner

METHOD AND APPARATUS FOR CHANGING A TELEPHONE NUMBER AFTER ENTRY

CROSS-REFERENCE TO RELATED APPLICATIONS

This application is a continuation of application U.S. Ser. No. 13/588,087 filed Aug. 17, 2012, now U.S. Pat. No. 8,744,066 issued Jun. 3, 2014. Said U.S. Ser. No. 13/588,087 is a continuation of application U.S. Ser. No. 12/266,711 filed Nov. 7, 2008, now U.S. Pat. No. 8,249,246 issued Aug. 21, 2012. Said U.S. Ser. No. 12/266,711 claims benefit of provisional application U.S. 60/986,363 filed Nov. 8, 2007. All of the above-referenced documents are hereby incorporated by reference.

BACKGROUND OF THE INVENTION

A telephone number within the North American Numbering Plan (NANP) is defined as a 3-digit area code, followed by a 3-digit central office code, followed by a 4-digit line number. Telephone numbers that begin with the same 3-digit area code are referred to as "being in the same area code" or "having the same area code." Typically when the originating and destination telephone numbers are both in the same area code, a telephone number can be dialed using only the 3-digit central office code followed by the 4-digit line number—this is known as the "7-digit telephone number," and is used for what is known as "7-digit dialing." If the originating and destination telephone numbers are not in the same area code, then the area code must be included when dialing—this is known as "10-digit dialing," because it uses the full 3-digit area code+the 7-digit telephone number. Historically, a single area code would be assigned to a specific geographic region, creating a framework where all telephone numbers allocated within that geographic region would begin with the same 3-digit area code. These geographic regions together with their associated area codes are often referred to as Numbering Plan Areas, or NPAs. The definition of an NPA taken from the Alliance for Telecommunications Industry Solutions (ATIS) website is as follows:

numbering plan area (NPA): A defined geographic area identified by a unique three-digit code used in the North American Number Plan Area. [T1.207-1998] [T1.209-1998] Note 1: Defined geographic area could mean the entire area encompassed by the North American Numbering Plan Area (for 800, 888, 877 codes, etc.). Note 2: By virtue of the overlay concept deployed in some states, there may be two (or more) NPAs assigned to the same defined geographic area.

Because every telephone number within a specific NPA always began with the same 3-digit area code, the architects of the telephone network took advantage of this characteristic, and designed dialing patterns which enabled calls to be made within a single NPA by dialing just the 3-digit central office code followed by the 4-digit line number, or in other words, just the 7-digit telephone number. Dialing the area code was unnecessary for these types of calls because the telephone network was programmed to assume that if only the 7-digit portion of a telephone number were dialed, then both the originating and the destination telephone numbers began with the same area code. This 7-digit dialing pattern became ubiquitous throughout the NANP for local calls within a single area code. Customers became familiar with this 7-digit pattern because, until recently, it was the main way that most local calls were dialed. Clearly, since it requires less effort to dial 7-digits compared to 10-digits or 1+10-digits, many people have become attached to dialing 7-digits for phone calls when possible, and in fact prefer it.

At least two factors have put pressure on the ability of a user to continue dialing/entering/specifying 7-digits to make telephone calls. One of those pressures comes from the telecommunications industry's "Industry Numbering Committee" (INC) in a proposal called the "Uniform Dialing Plan." This plan promotes the idea of doing away with 7-digit dialing altogether, in favor of dialing all calls using the full 10-digits. The INC's proposal argues that it would be beneficial if all phone calls were dialed with the same 10-digit pattern, regardless of whether the originating and destination phone numbers were in the same area code. Although this proposal would provide certain benefits (in the form of simplified administration for phone companies, and a consistent method of dialing for everyone using the telephone system), customers would be forced to update equipment, reprogram auto-dialers, change databases, and dial 3 or 4 extra digits for every phone call. In the case of having to dial the 3-digit area code along with the 7-digit telephone number, the result would be 43% (3/7) more digits than for a 7-digit call alone, and in cases where a "1+" the 3-digit area code is required the result is that customers have to dial 57% (4/7) more digits. So, for the consumer, the change to 10-digit or 1+10-digit dialing requires extra effort and leads to wasted time and potential frustration. This is especially so if a wrong number is dialed and the user then has to redial from scratch. For example, not limitation, if a caller dials 7-digits, but 1+10 digits are required, the caller will have to hang up and redial. After doing so, the caller will have dialed 18 digits to complete the call.

The other factor which has put pressure on 7-digit dialing comes from the fact that in the past decade it has been necessary to introduce many new area codes to keep up with the demand for new telephone numbers. Historically, a new area code would be introduced by splitting an existing Numbering Plan Area (NPA) roughly in half geographically, keeping the original area code for all of the telephone numbers that are located in one half, and changing the area code for all of the telephone numbers in the other half—the result is two geographically-smaller NPAs, each with their own area code. This method is disruptive because customers who get the new area code lose their original 10-digit phone numbers. Since the 7-digit portion of their phone number remains the same, customers within each of the new NPAs can still make calls within their own NPA by dialing the same 7-digits they used in the past. However, they can no longer use just 7-digits to make calls across the newly-defined line where the original area code was split—those calls will require dialing the full (1+) 10-digit number. In addition, callers in area codes outside of the original NPA, will have to use the new area code to connect with customers whose 10-digit numbers changed as a result of the new area code. And because it is not always obvious to the caller that he is calling someone who got the new area code (or that an area code split even happened in the first place), there is additional disruption and confusion.

Recently, a new method for introducing new area codes has been implemented in several NPAs. This new method is called an area code overlay. With overlays, instead of creating two new NPAs out of an existing NPA, the new area code is simply laid on top of the existing Numbering Plan Area. Thus both area codes occupy the same region, nobody has to give up their existing phone number, and the disruption that comes from the re-distribution of 10-digit telephone numbers is eliminated. However, a different kind of disruption occurs in overlays. Due to certain technical and regulatory issues related to overlays, 7-digit dialing in these regions is impractical and has been disabled by the phone companies. This is unfortunate because even though the 7-digit dialing pattern no longer functions within overlay areas, people and automatic dialing devices will often attempt to dial telephone numbers without first dialing the area code. With people, the reason for misdialing by using a 7-digit telephone number is often because of habit or a lack of knowledge about the new dialing pattern, and with automatic dialing devices the reason is because the devices have been previously programmed with only the 7-digit telephone number. The disruption to the 7-digit dialing pattern is a source of frustration for customers, and for phone companies, results in significant wasted network resources that must be allocated to deal with 7-digit misdials. (For example, the network first has to determine that the 7-digits it received are a "misdial," then the network has to provide an announcement describing how to redial, the current network/user transaction has to be terminated, a new network/user transaction has to be initiated, and then the network has to receive and interpret the new (1+) 10-digits that the user dials.) Additionally, this disruption to the established 7-digit dialing pattern results in a cost of time and money that is needed to update and/or reprogram customer equipment such as PBXs, auto-dialers, security dialing systems and the like.

The need for a solution that would mediate the problems caused by disruption to established 7-digit dialing patterns can be seen in the following discussion: In situations where an area code is required for dialing, if a 7-digit telephone number is dialed by mistake, the user typically hears a message instructing him or her to hang up and redial using the area code plus the 7-digit telephone number. So, instead of the three extra digits (for the area code) that the customer forgot to enter to begin with, he or she has to hang up and redial the complete 10-digit number, which along with his or her original 7-digit misdial is 70% ($7/10$) more digits than if the 10-digit number had been dialed correctly to begin with (and 143% (10/7) more digits than if 7-digit calls could still be made in this situation). Clearly, this can be quite time consuming and frustrating for customers, and it is especially difficult for people with certain physical disabilities, the elderly, and young children, who may find it difficult to dial a telephone to begin with. With automatic dialing devices the situation is even worse, since the machine cannot hang up and redial in the correct manner.

One solution for minimizing this disruption can be found in applicant's previous U.S. Pat. Nos. 6,061,443; 6,343,125; and 6,687,365 together with pending U.S. application Ser. No. 10/707,956, which are hereby incorporated by reference and included in the cross reference to related applications herein. These patent documents disclose a method and apparatus for dialing 10-digit phone numbers while entering the fewest possible digits, using a limited selection of (ten or eleven) area codes for any given implementation. The objective is to preserve as much as possible of the look and feel of the previously-established dialing pattern for a region. Specifically, the foregoing allow users to select from a list of pre-designated area codes after having entered/dialed/specified a 7-digit number. In the foregoing, a single extra digit— or even the absence of a digit after a timing delay pause, or in other embodiments, without the timing delay pause—allows the user to select the appropriate area code, and thus complete the call with minimal additional keystrokes (one or none).

In contrast to the foregoing, it would be desirable to provide a method and apparatus to specify any area code in response to a determination that an area code is missing, but is required to complete the call. Particularly, it is desirable that there be no limitation on the number of area codes which are available to choose from (simply enter the entire area code without being restricted to a pre-designated set of area codes), and no need to designate a list of selectable area codes beforehand.

It is further desirable to provide a method and apparatus which enables correction of a misdialed number—particularly one for which the omission or misdialing of an area code is the error—without re-keying the digits which have already been dialed. This type of dialing error will become more frequent as disruption to established dialing patterns spreads, as a result of area code splits, overlays, the INC's "Uniform Dialing Plan," or any other change that affects the way that telephone numbers have traditionally been dialed.

SUMMARY OF THE INVENTION

A method and apparatus for telephone number dialing/ entering/specifying which enables certain required information such, as, but not limited to, the area code portion of the telephone number to be dialed/entered/specified after other portions of the telephone number have been dialed/entered/ specified, in response to a determination that the person (or device) dialing has omitted some required information such as a destination area code. For example, not limitation, the invention makes it unnecessary to specify the telephone number's area code at the beginning of the telephone number or dialing sequence, even in situations which require telephone numbers to include the area code. In situations where an area code is required for dialing, the invention allows calls that have been dialed without an area code to be completed by specifying the area code later—there is no need to hang up and redial with the area code at the beginning of the telephone number in order to dial/enter/specify the area code and successfully complete the call. It is also possible to correct misdialed digits, after the telephone number has been dialed/ entered/specified, without having to re-enter the information which has already been entered. The invention also applies to changes in dialing patterns and elements that may be introduced due to future expansion of, and/or changes to, the North American Numbering Plan.

In its broadest formulation, this disclosure is for a method and related system and computerized instruction for assisting a user with placing a telephonic call, comprising: a user specifying an originally-specified telephone number to place an intended telephonic call, which telephone number, as originally-specified, for at least one particular reason, cannot be used to successfully complete the intended telephonic call; the user, after specifying the originally-specified telephone number, later specifying later-specified telephone number elements; and causing the telephonic call to be successfully signaled using the originally-specified telephone number in combination with the later-specified telephone number elements, without the user having to re-specify the originally-specified telephone number.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

Figure 1A:
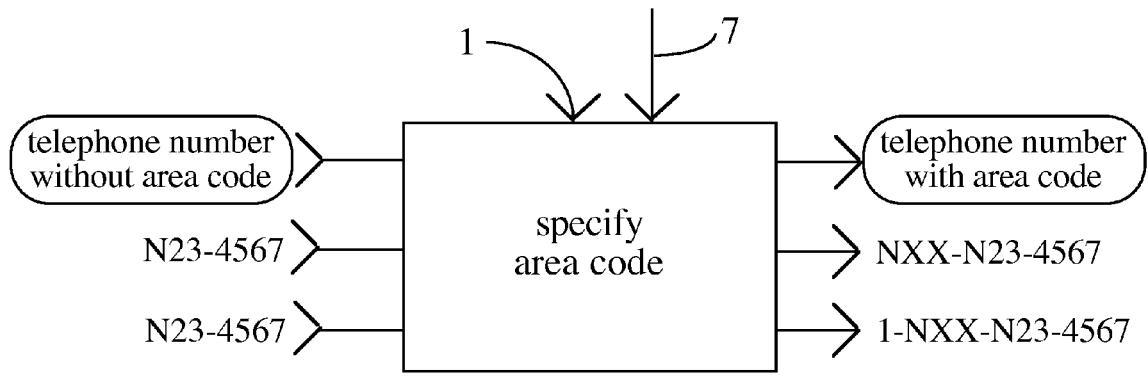
FIG. 1a is block diagram illustrating a number conditioning device 1 accepting input of a telephone number without area code (for example, not limitation, 7-digit number), wherein an area code is then specified after dialing of the 7-digit telephone number has begun, and consequent output or signaling of a 10-digit or 1+10-digit number. Programming means 7 are used to program and customize number conditioning device 1.
Figure 1B:
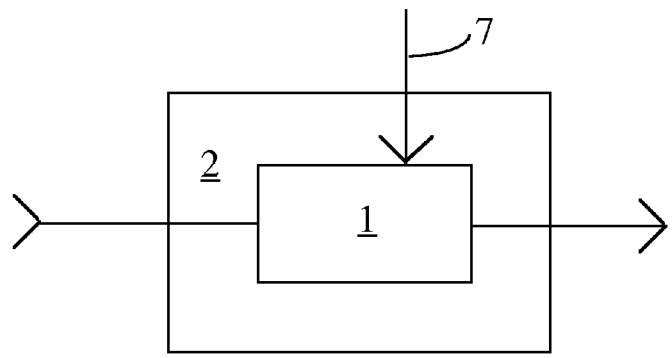
FIG. 1b shows the method or apparatus of FIG. 1a incorporated into telephone network equipment 2, e.g., a switch.
Figure 1C:
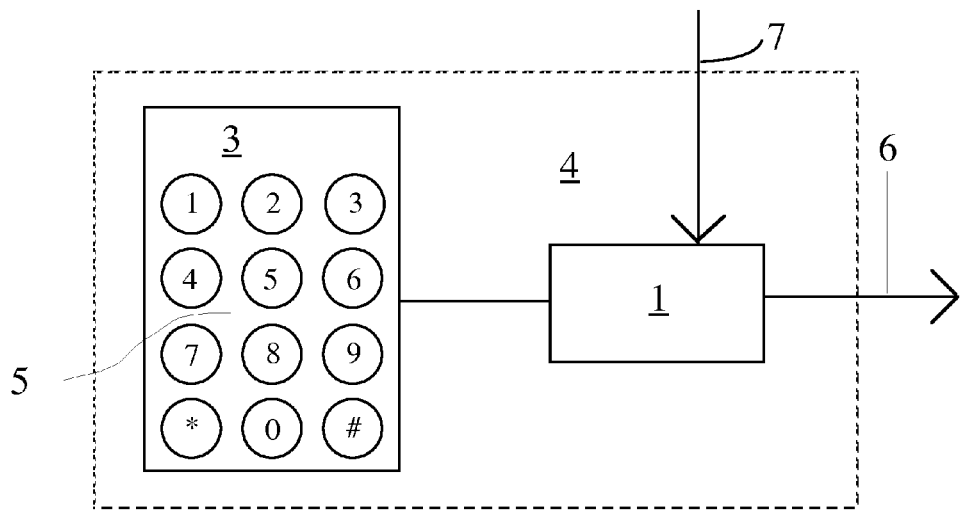
FIG. 1c shows the method or apparatus of FIG. 1a incorporated into a CPE device connected between a standard telephone 3 with keypad 5 and the telephone network line 6. It can also be used to show a telephone that has been designed to have the method or apparatus incorporated into it, all encompassed by 4.

These figures are also intended to encompass embodiments which might be manifested in a computer, in software, in mobile phones, in voice over internet (VOIP) applications, and any other system or device for providing the functionality herein disclosed. In short, what is disclosed is end-user functionality which can be implemented through a range of hardware and/or software approaches by someone of ordinary skill, and so this disclosure applies to any hardware and/or software which serves to implement the disclosed functionality.

DETAILED DESCRIPTION

The disclosure herein, in a primary embodiment, enables the user to be able to enter the full area code after the 7-digit number has been entered/dialed/specified, in response to a determination that an area code is needed. This specifying of the area code at the end of the phone number (or at some place after at least the first digit of the 7-digit phone number has been dialed) instead of at the beginning, may be in response to some kind of a prompt, or may be entered without having to wait for a prompt. If a prompt were used, it might be something like this "Enter the area code of the telephone number you are dialing," after which the user would be able to specify any area code, not only those which might exist in a pre-designated list. The hardware and/or software would then respond by using this area code information in combination with the originally-dialed number in whatever manner is required, and signaling a call. This solution eliminates the need to hang up and redial in any situation where an area code might be required to make a phone call, since the area code could be dialed/entered/specified after the 7-digit portion of the telephone number (or part of the 7-digit portion of the telephone number) is dialed/entered/specified and would not require users to hang up and redial with the area code at the beginning of the number in order for the call to be completed. After the area code is dialed/entered/specified, signaling is processed in a manner that allows the call to be successfully connected to the destination telephone number.

So, no matter why an established 7-digit dialing pattern is disrupted (whether because of an area code split, an overlay, the INC's "Uniform Dialing Plan," or some other disruptive condition), there is still a means of completing the dialing of a call without having to hang up and start the dialing sequence all over again.

If the INC's 10-digit Uniform Dialing Plan were to be implemented universally, the invention disclosed herein would enable users to simply specify the area code to "repair" a call that had been misdialed as a 7-digit number. Also, in an overlay, where 7-digit dialing patterns no longer are active, users would be able to specify the area code for which the call was intended, after they misdialed the call as a 7-digit number. And, in any situation where an area code is required for dialing, it would be possible to dial any telephone number in this manner, simply by dialing the 7-digit portion of the number, and then specifying the area code for the number being called.

Even in situations where area code splits occur, there is a period of time where this invention would be useful. For instance, when the split first goes into effect, there is no duplication (or very little duplication) of 7-digit phone numbers between the old area code and the new area code—this is because there has not yet been enough time for very many new numbers to have been issued. In this situation, at present, for example but not limited to, when a customer who kept the original area code dials a 7-digit phone number that is now in the new area code, he or she is told that the number dialed does not exist (since it is no longer active in the area code the call is being dialed from), or the message might say that the number being dialed now has a new area code, and the user is instructed to hang up and redial using the full 10-digit or 1+10-digit telephone number. With the invention disclosed herein, when a customer dials a 7-digit call that cannot be completed because it is no longer in the customer's originating area code, the customer is given an opportunity to enter the correct area code so that the call can be completed. This eliminates the need to hang-up and redial using the full 10-digit or 1+10-digit telephone number. Naturally, as time passes, this functionality would need to be disabled on a phone number-by-phone number basis (or phased out in some other appropriate manner), since each time a 7-digit number is reissued in a caller's own area code, the call will again connect as a 7-digit number, without giving the caller an opportunity to specify that he/she wanted to connect to a different area code.

This invention is also beneficial for auto dialers which have been preprogrammed with 7-digit telephone numbers. After the auto dialer dials the 7-digit number, if the call cannot be completed because an area code is now required, the user is able specify the appropriate area code in order to allow the dialing process to complete. Without this invention, the user would have to hang up and redial the full 10-digit or 1+10-digit number. This can be a real problem if the user does not know what number the auto dialer had previously been programmed to dial. This situation could easily arise if the number had been programmed long ago, or if someone other than the person who originally programmed the device is making the call. Naturally the auto dialer could be reprogrammed if the user still knows the original telephone number and area code, and also knows—or remembers—how to program the device, but doing so is not always practical.

Another problem that this invention addresses involves older auto dialers and equipment which, because of internal memory limitations, may not be able to be programmed with a full 10-digit or 1+10-digit number. This situation has been documented as having been a problem in 1999 when the original 310/424 overlay was attempted. Significant disruption resulted from the security auto-dialers on apartment building entry systems and the like, when they couldn't be programmed to accommodate the new 1+10-digit overlay dialing pattern. All of these memory-limited devices had to be replaced with newer models, at significant expense. In fact, the frustrations from this problem contributed to the repeal of the 310/424 overlay a few months after it was implemented. Again in such a case, the customer would have an opportunity to enter the area code after the device had dialed the 7-digit portion of the telephone number, and the call would be connected.

In this disclosure, we have referred to, or will refer to 7-digit, 1+7-digit, 10-digit, 1+10-digit and (1+) 10-digit telephone numbers in examples used to illustrate the various embodiments of this invention. Some of these references may be loosely used interchangeably, and consistency in the illustrative examples may not be completely maintained. This is partly because of the inconsistent way that the "1+" is used throughout the NANP. For instance, in California and about 15 other states, the "1+" is only used to indicate that a 10-digit number is about to be dialed. It has no other purpose, and it is never used with 7-digit dialing. In approximately 34 other states, like Florida, the "1+" is used as a toll indicator, and it must be dialed if someone is making a toll call. By the same token, one cannot use a "1+" for a local call. Sometimes the "1+" is used as a toll indicator with 7-digit numbers where the origination and destination phone numbers are in the same area code, but again, 1+7 cannot be used for a local call. Also, there may be places where this disclosure refers to "area code," when "1 plus the area code" would be more accurate, and vice versa. However, it is to be understood that these various usages of terminology have an inherent inconsistency reflective of inconsistencies in how a "1+" is used throughout the NANP, and no limitation is intended by one use of terminology over another, consistent with NANP practices and understandings. In cases where the format "(1+) 10" or "(1+) 7" is used in this disclosure, the "(1+) is meant to encompass either usage, depending on the particular local dialing rules.

Naturally, the same concepts described for this invention are applicable if the number of digits in a NANP telephone number is changed from the current 10-digits to some different number of digits (either more digits or fewer digits) in the future. This invention is not limited by the number of digits that could potentially be used for an area code, a central office code, or the subscriber line number, but would apply to any foreseeable or unforeseeable reconfiguration of these telephone number elements. This invention would even apply if a new telephone number element or elements (similar to the "area code", the "central office code" or the "line number") were added, or if the existing elements were rearranged, modified, or eliminated. The references to 10-digit and 7-digit telephone numbers which are made in this description and in the drawings for this invention, are used to make the discussion easier to follow, but the same concepts would be applicable even if changes were to be made to the established format of a telephone number. Therefore what has been described here in this discussion would apply to those situations as well, and is intended to fall within the scope of this disclosure and its associated claims.

The term "specify" (or dial/enter/specify) when used in the context of this disclosure, is intended to not be limited to merely dialing, entering, speaking, selecting or any other means of specifying. Any manner by which the area code, or other dialing elements discussed here, can be specified by the user for the purpose of signaling or completing a call, including by automated dialing devices in which those dialing elements are electronically stored, is intended to be covered by this disclosure.

This invention is intended to cover both the method and any associated apparatus which would be used for the purposes described here, as well as computer-readable media comprising a set of instructions, i.e., a computer program. The apparatus could be a telephone company switch, a customer premises device, it could be built into a telephone, could exist on a computer as a device or as software running on a computer, could be part of a VOIP or other internet-based system, could be used in conjunction with a wireless phone or other device, or could be any manifestation in software and/or hardware which would provide the functionality described here, implemented by programming and design practices familiar to those of ordinary skill in the art.

Also, while dialing/entering/specifying of the area code, or other elements disclosed here, would ordinarily occur at the end of the dialing of the 7-digit portion of the telephone number, it is understood within the scope of this disclosure that this could be done at any point during the dialing/entering/specifying process after the first digit of the "7-digit" number has been dialed.

Also, consistent with the disclosure of applicant's earlier aforementioned patents, there may be a default trigger, wherein a default area code is assumed to be the area code intended by the dialer if some other dialing/entering/specifying action is not made.

At this point in the disclosure, it is helpful to contrast the present invention disclosure to those of applicant's previous U.S. Pat. Nos. 6,061,443; 6,343,125; and 6,687,365 and pending U.S. application Ser. No. 10/707,956. Although the foregoing patent documents enable a user to correct misdials in limited situations like overlays and other pre-designated assortments of area codes, where there are a limited number of area codes to choose from (typically 2 or 3), the disclosure herein allows that corrective function to be available universally—in both overlay and non-overlay situations where dialing with an area code is required—without any restriction about the diversity of area codes which can be specified.

For instance, if the telecommunications industry decides to implement its "Uniform Dialing Plan," where everyone in the NANP is forced to dial 10-digits for all calls, everywhere, the disclosures in applicant's foregoing patent documents would not do much to minimize disruption, since, from a standard touch tone or rotary phone, these are restricted to at most ten or eleven area codes. With the disclosure herein, whenever someone dials 7-digits, they would always get an opportunity to dial/enter/specify whatever area code they wanted, without limitation, and would never be regarded to have misdialed or be required to redial the digits they had already entered.

Thus, this disclosure facilitates the INC's "Uniform Dialing Plan," because it provides a far-less disruptive method for the public to make a universal transition to 10-digit dialing. This disclosure also has the advantage of not restricting the caller to a limited response based on a pre-designated set of no more than ten or eleven area codes. So, no matter what area code or overlay region this device and method might be used in, the implementation would be the exactly the same, everywhere.

Unlike the applicant's prior patent documents which require custom setup on a region-by-region or user-by-user basis (to map the list of relevant area codes to the list of area code selectors), the current disclosure is generic, and can be implemented the same way everywhere. For example, not limitation, if it is determined that the number dialed did not include the area code and that an area code is needed, an announcement stating, for example, not limitation, "Enter the area code of the telephone number you are dialing" would be able to be used in any region, and the caller's response could be any area code, and would be acted on the same way no matter where in the NANP the number had been dialed.

This disclosure is also very helpful in cases where someone from one area code (say, 818, which still allows 7-digit dialing) didn't realize he or she was in a different area code (say, 310, which is an overlay, where area codes are required for dialing), and attempted to dial what he or she thought was an 818 number with only 7 digits. In the existing system which is in place today, the caller would be told to, e.g., "Hang up and redial with 1 plus the area code plus the 7-digit telephone number." By contrast, in situations like the scenario described above, where dialing an area code is required, the invention disclosed herein would intercept all calls dialed with 7-digits, and provide an opportunity for the user to tell the network which area code the user wants the call to go to.

This invention could also provide benefit if a caller dialed a 7-digit number (or even a (1+) 10-digit number) that is not currently in service. It could be that the reason the number is not in service is because the caller called the correct 7-digit portion of the number, but not the correct area code. Instead of being told, e.g., to "Hang up, check your directory, and dial again," an announcement could be triggered that would give the caller an opportunity to provide the area code (or provide a different area code) to complete the call. In this scenario (where the dialed number is not in service), it wouldn't matter whether the caller dialed a 7-digit or a (1+) 10-digit number, because in either case the caller is given the opportunity to provide a new area code. This would work in situations where an area code is required, as well as in situations where 7-digit dialing is available—in this case, it would be the fact that the dialed number is not in service that triggers the message, and not necessarily solely due to the determination that an area code is required.

The device and method disclosed herein is very simple and elegant. It is implemented in conjunction with a simple message along the lines of "Enter the area code for the telephone number you are dialing," and would be universal. It could also be implemented without the requirement that a message be used.

The original U.S. Pat. Nos. 6,061,443; 6,343,125; and 6,687,365 and pending U.S. application Ser. No. 10/707,956 are all aimed at requiring the user to dial as few digits as possible, while this disclosure is aimed at eliminating the need to reenter keystrokes following the message that says, e.g., "Hang up and redial . . . " Instead, this disclosure provides a way to complete calls without having to hang up and redial following a "misdial" (e.g., where 7-digits are dialed, but (1+) 10-digits are required), but, in contrast to the foregoing applicant's patent documents, it would require entering the same number of digits as are required to dial the number correctly to begin with (except that the "1+" might or might not be required). In implementation, the, e.g., "Hang up and redial . . . " message is supplanted with an, e.g., "Enter the area code for the telephone number you are dialing" message, and the hardware and/or software then activated accepts the entered area code and completes dialing using that area code in proper conjunction with the seven digits originally-entered.

The device and method of this disclosure thereby achieves the following objectives:
1) It allows customers to complete any call they had accidentally dialed with only 7-digits, regardless of the area code they had meant to dial. There is no limitation in the choice of area codes.
2) It provides a way for auto dialers which have been programmed with only 7-digits to complete calls without reprogramming, as the user would be able to enter the area code after the auto dialer dialed the 7-digit number.
3) It could take advantage of a 7-digit default, but might work slightly differently than in applicant's foregoing patent documents. If there was no response to the "Enter the area code for the telephone number you are dialing" message, the call might default to the area code of the device that had dialed the number, or to some other pre-specified area code. This would ensure that unattended auto dialers would still be able to complete their calls, even with the type of disruption to the established dialing patterns which would attend implementation of something on the order of the INC's 10-digit Uniform Dialing Plan.

4) In both 7 and 10-digit dialing regions, if a dialed number happens to be "not in service" and so is either wrong or the call cannot be successfully completed without specifying an area code, an opportunity could be given to the caller to specify the area code (or in the case where the caller had already dialed 10-digits, an opportunity could be given to the caller to modify the area code). This could help in situations where there has been a recent area code split, the dialed number now has a new area code, and the number in the original area code has not yet been assigned (thus triggering the out of service condition). This "not in service" trigger could also be helpful in situations where a caller thinks he or she is dialing in an NPA which is different from the NPA he or she is actually dialing in. In this case, the 7-digit number dialed would be signaled to an area code that is different than what the caller had intended. If the number dialed happens to not be in service, the user would be given the opportunity to re-specify the area code, after which the number would be signaled to that area code, and the call could be connected without having to hang up and redial the entire number.
5) It could also provide a way to specify or modify other required dialing elements, in response to a determination that those other dialing elements are or are not needed, (such as the "1+" or some new dialing elements that may be required for dialing in the future) using the same framework already described for area codes in this disclosure.

The invention according to this disclosure would thereby allow a single region, or multiple regions, or the entire NANP, to convert to a dialing plan where only 10-digit or 1+10-digit dialing is allowed, without the disruption and inconvenience that would otherwise occur. And, it does this in a very simple and elegant manner, with minimal change to the user interface, with minimal required hardware and/or software modification, and with a universal approach that can be applied anywhere and everywhere.

Alternate embodiments of the invention could function slightly differently from what has so far been described. Those embodiments are described and illustrated below.

There may not be a message instructing the user to "Enter the area code of the telephone number you are dialing." It might just be the normal, e.g., "Hang up and redial . . . " message. In this case, the caller might be able to trigger the invention's functionality by entering some special code, such as "#" or "*" or "*#", without limitation, and then enter the area code. Or, the caller might enter the area code and then enter the special code, or might just enter the area code. In each of these cases, the later-specified telephone number elements, e.g., area code, would then be combined with the originally-specified telephone number, yielding in combination, all that is needed to successfully signal the telephonic call. This would make use of, e.g., a memory which stores the most-recently dialed (originally-specified, 7 or 10 or 1+10 digit, etc.) number. This memory is similar to the memory that is already found in virtually all modern telephones for redialing purposes. However, existing redial memories erase what is in memory as soon the user enters any new digits, while the information in the redial memory which supports this disclosed functionality should stay intact until the software and/or device determines that the new information is not merely intended to modify what was already dialed, but is a brand new dialing effort (for example, not limitation, entry of a seven digit number which differs from the last-entered seven digit number by one or more digits might replace the memory of the seven digit portion of the previous dialing effort, while the entry of a three digit area code would not affect said seven digit portion in memory). The rest of the process would then be the same as that described in the previous illustrations.

Alternatively, upon hearing the "Hang up and redial . . ." message, the caller could hang up, lift the handset, enter some special code like (not limitation) "#" or "*" or "*#", and then enter the area code. Or, the caller might enter the area code and then enter the special code, or he might just enter the area code. The rest of the process would then be the same as that described above. Again, this makes use of a memory storing the most-recent dialing effort.

In any case, the embodiment could be triggered by some other activation sequence either in response to an announcement, independent of an announcement, or after hanging up.

This last variation—and many of the other described embodiments—would be dependent, as noted, upon storing in a memory the number that was originally dialed, so that when the caller provides the later-specified telephone number elements, e.g., new area code (or other new) information, this later-specified information can be used to properly reconfigure the previously stored number, so that successful signaling of the (1+) 10-digit number can occur.

Storing the dialed number in a memory could also underlie other embodiments, such as providing opportunities for multiple attempts at modifying the, e.g., area code information, in order to successfully complete a call without having to redial the entire number. In this embodiment, each subsequent entry of area code data would change only the area code portion of the number in memory. This would not lead to unnecessary misdials, since the caller would be trying those variations anyway by hand, trying to find the right of area code for the 7-digit number he or she was trying to dial. Any inadvertent misdials would happen with or without this invention. This embodiment would provide a way to modify the area code even after one was entered, if it turns out that the one that was entered was not correct. This can be applied to other dialing elements as well, for example, not limitation, if the user accidentally used a code to disable caller ID, rather than enable caller ID.

Another logical variation on the embodiments that have been described above would be to provide an opportunity to add a "1+" to either a 7-digit or a 10-digit number that had already been dialed, using similar techniques to those already described.

Another logical variation on the embodiments that have been described above would be to provide an opportunity to remove a "1+" from either a 1+7-digit or a 1+10-digit number that had already been dialed, using similar techniques to those already described.

Another logical variation on the embodiments that have been described above would be to provide an opportunity to add or modify other leading elements like special access codes, country codes, or custom calling features like "*82" (which temporarily unblocks a caller who has caller ID blocking), to a (1+) 7-digit or a (1+) 10-digit number that had already been dialed, using similar techniques to those already described.

Another logical variation on the embodiments that have been described above, would be to provide multiple opportunities to add, modify or remove any of the elements described above. For example, not limitation, if the first announcement was to "enter the area code of the telephone number you are dialing," and then, after doing so, it was determined that the area code that was entered also needs to have a "1+" added as a toll indicator, then another opportunity would be provided for entering the "1+" as the toll indicator. By the same token, if a "1+" had been entered, and it was unnecessary, an opportunity would be provided for deleting the "1+". All of this uses, e.g., a memory which stores information from the most-recent call attempts.

Another logical variation on the embodiments that have been described above would be to provide way for the numbers that have successfully been dialed—either with or without the user input or modification as has already been described—to be stored in a database that would be used as a reference to assist a caller in successfully completing calls in the future. The assistance could either be automatic, or could be dependent on user input.

Another logical variation on the embodiments that have been described above would be that if a caller takes advantage of this method or apparatus, the rules about "1+" or not "1+" could be suspended, so that it would not be necessary for the caller to deal with the issue of a "1" at all.

Another logical variation on the embodiments that have been described above would be that the message might ask for "1+" the area code, or that the caller would have the option to include it or not include it when entering the area code, since it would already be clear what the user was trying to enter.

Another logical variation on the embodiments that have been described above would be to have part of the message provide a cost disclosure such as "if you take advantage of this service, you may be charged for a toll call," or there could be a warning after providing the area code, if it were determined that the resulting call would be a toll call. In either case, the caller might have to respond, or alternately, if the caller does not respond, the call could be connected, or not, by default, after some specified period of time.

Another logical variation on the embodiments described above, is that upon specifying an area code, the method or apparatus could automatically add other information if necessary—like the "1+", or it could remove the "1+" if the caller had added it and it wasn't necessary.

Another embodiment of the invention would intentionally force the caller to dial every call with the full (1+) 10-digit number, even if the local dialing plan does not require it. This could be implemented as a Custom Calling Service offered by the telephone companies, or as CPE or some other appropriate software or device. This might be of interest to people who typically are calling to area codes other than their own, and forget to add the area code before making the call. Or it might be of use to someone, or a business, where the people using the phones might not be clear about what area code the phone they are dialing from is actually in.

Without this invention, if someone dialed a 7-digit number, but was wrong about what area code they thought they were dialing from, they would either reach a wrong number, or would be told that the number is not in service. In either case they would have to hang up and dial the entire (1+) 10-digit number again.

With this embodiment (implemented as a Custom Calling Service offered by the telephone companies, or as CPE or as some other appropriate software or device) the caller's phone would operate as if the INC's Uniform Dialing Plan had already been adopted (like a private Uniform Dialing Plan), but with the invention disclosed here, the caller would be asked to specify the area code every time he or she dialed a 7-digit number. This service could also be toggled on or off, depending on whether or not the caller wanted all his or her dialing to be filtered through this service.

Another logical variation on the embodiments that have been described above would be to provide similar functionality to assist callers with dialing changes that might be introduced by changes to the North American Numbering Plan—i.e. NANP Expansion, where additional digits might be added to all existing 10-digit numbers. For example, not limitation, if the expanded NANP adds two new digits immediately following the area code, current 10-digit dialing patterns will be disrupted. With this embodiment of the invention, if a caller dials a 10-digit number, a prompt could instruct the caller to specify the additional "new" digits. After the caller specifies the two new digits, the call would be completed. There would be no need for the caller to hang up and redial the entire 12-digit number. In this situation, the originally-specified telephone number comprises a telephone number which could have been used to successfully complete the intended telephonic call under a superseded dialing plan, where the superseded dialing plan has been superseded by a superseding dialing plan, and the later-specified telephone number elements comprise telephone number elements required, in combination with the originally-specified telephone number, to successfully complete the intended telephonic call in accordance with the superseding dialing plan.

Another logical variation on the embodiments described above would provide an announcement before, during or after dial tone (or in some other appropriate manner), before the start of dialing, that would instruct the caller that (1+) the area code is required for dialing. This might not be of value if an auto dialer were dialing, but it could provide human dialers with a way of remembering to specify the area code.

In another variation, this embodiment could co-exist with the applicant's invention as disclosed in applicant's aforementioned patent documents, which allows callers to select— with a single digit—the area code for which they intend their call. As was previously described above, the limited selection of pre-defined area codes which are available in applicant's previous patent disclosures contrast with the current disclosure which addresses an unlimited calling domain. However, in certain situations, particularly in overlay regions, the prior patent disclosures do provide a simplicity and ease of use that surpasses that of the present disclosure. This said, there is no reason why all of these disclosures cannot be configured in certain situations to work in conjunction with each other. For example, not limitation, upon hearing the list of available area code choices (e.g. "dial 1 for the 310 area code, dial 2 for the 424 area code") if the area code the caller wants is not on that list, he or she could activate the functionality of the current disclosure. For example, not limitation, this could be triggered if the caller entered a "*", or if the caller hung up, dialed just the area code and then dialed the "#" key. (The keys mentioned here are illustrative, not limiting.) In this way, callers could enjoy the combined benefits of both disclosures.

With this, and with all of the embodiments described throughout this disclosure, there could also be a call-by-call override option where the caller would be able to indicate that the 7-digit number he or she dialed was intentional, and that the call should be signaled to the area code that the call was being dialed from (like standard 7-digit dialing). For example, not limitation, this override could be initiated by pressing the "#" key, or by some other pre-determined action. The caller could use this override action immediately after dialing the 7-digit number, or could wait until the announcement indicated that an area code should be specified.

Further, there could be an option where a user may specify in advance, a different area code (which could be other than the area code the user is calling from), which would be used in these override cases.

Further, there could be a variation where activation of the default or home area code is triggered after a timing delay.

Further, another variation could take advantage of the technique disclosed in applicant's previous patent documents, where the user could respond with "1#" (or some other appropriate action), which would act to specify that the area code mapped to "1" was to be used, or "2#" which would indicate that the area code mapped to "2" should be used, and so on.

Finally, this disclosure is envisioned to apply to a situation where the originally-specified telephone number comprises a telephone number for which at least one telephone number digit is not correct, and the later-specified telephone number elements comprise at least one corrected telephone number digit, correcting the at least one telephone number digit which is not correct. This, in essence, allows correction of misdialed digits, without having to reenter the entire telephone number.

All of the methods described above can be implemented in connection with, for example not limitation, telephone company central office or other telephone network based equipment, a modified custom calling service, an internet based telephony company's equipment or service (like VOIP), any kind of implementation in software, mobile phones, or be made accessible to individual telephone subscribers using software or computerized customer premise equipment.

It is also to be understood that much of the disclosure herein is intended to refer to functional features at the user interface, irrespective of the details of how those features are implemented in the actual software and/or hardware, and with the understanding that someone of ordinary skill, once given the functionality described and disclosed herein, can readily produce software and/or hardware, e.g., a CPE device or telecommunications company equipment, e.g., a switch, which implements the functionality referred to, and in which the details of how the hardware implements the disclosed functionality are transparent to the user. For example, not limitation, when the disclosure speaks of combining a seven digit number with a three digit area code (3+7), this is a functional description of what occurs at the user interface level. In fact, it may well be that by the time a the telecommunications company equipment eventually receives these 3+7 digits (irrespective of the order in which they were actually dialed/entered/specified), they have been transformed into some representation other than 3+7 digits before a call is actually signaled. The details of what happens and of how call information is represented at the switch/routing level are therefore understood to be transparent to the user, within the capacity of someone of ordinary skill in the art, and thereby, irrespective of these details, within the scope of this disclosure.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A method for assisting a user with placing a telephonic call, comprising:
   a user specifying an originally-specified telephone number to place an intended telephonic call, which telephone number, as originally-specified, for at least one particular reason, cannot be used to successfully complete the intended telephonic call;
   the user, after specifying the originally-specified telephone number, later specifying later-specified telephone number elements, including the possible deleting, ignoring or changing of part of said originally-specified telephone number and/or related dialing elements; and
   causing the telephonic call to be successfully signaled using said originally-specified telephone number in combination with said later-specified telephone number elements, without the user having to re-specify said originally-specified telephone number; wherein:
   said originally-specified telephone number is stored in a redial memory of a device used to place said telephonic call, for purpose of said deleting, ignoring or changing and signaling, until the user initiates a brand new dialing effort to place a new telephonic call.

2. The method of claim 1, wherein:
   said originally-specified telephone number comprises a telephone number entered without an area code;
   said at least one particular reason comprising that the telephonic call cannot be successfully completed without specifying said area code; and
   said later-specified telephone number elements comprising said area code.

3. The method of claim 1, wherein:
   said originally-specified telephone number comprises a telephone number entered without a dialing prefix;
   said at least one particular reason comprising that the telephonic call cannot be successfully completed without specifying said dialing prefix; and
   said later-specified telephone number elements comprising said dialing prefix.

4. The method of claim 1, wherein:
   said originally-specified telephone number comprises a telephone number for which at least one telephone number digit is not correct;
   said at least one particular reason comprising that said at least one telephone number digit is not correct; and
   said later-specified telephone number elements comprising at least one correction to said at least one telephone number digit which is not correct.

5. The method of claim 1, wherein:
   said originally-specified telephone number comprises a telephone number which could have been used to successfully complete the intended telephonic call under a superseded dialing plan;
   said at least one particular reason comprising that the superseded dialing plan has been superseded by a superseding dialing plan; and
   said later-specified telephone number elements comprising telephone number elements required, in combination with said originally-specified telephone number, to successfully complete the intended telephonic call in accordance with the superseding dialing plan.

6. The method of claim 1, wherein:
   said originally-specified telephone number comprises a telephone number entered without an area code;
   said at least one particular reason comprising that it is intentionally desired to have the user dial all calls so as to include an area code; and
   said later-specified telephone number elements comprising said area code.

7. A computerized system for assisting a user with placing a telephonic call, comprising a user interface, computerized processing, and computerized storage for:
   a user specifying an originally-specified telephone number to place an intended telephonic call, which telephone number, as originally-specified, for at least one particular reason, cannot be used to successfully complete the intended telephonic call;
   the user, after specifying the originally-specified telephone number, later specifying later-specified telephone number elements, including the possible deleting, ignoring or changing of part of said originally-specified telephone number and/or related dialing elements;
   causing the telephonic call to be successfully signaled using said originally-specified telephone number in combination with said later-specified telephone number elements, without the user having to re-specify said originally-specified telephone number; and
   keeping said originally-specified telephone number in a redial memory of a device used to place said telephonic call, for purpose of said deleting, ignoring or changing and signaling, until the user initiates a brand new dialing effort to place a new telephonic call.

8. The system of claim 7, wherein:
   said originally-specified telephone number comprises a telephone number entered without an area code;
   said at least one particular reason comprising that the telephonic call cannot be successfully completed without specifying said area code; and
   said later-specified telephone number elements comprising said area code.

9. The system of claim 7, wherein:
   said originally-specified telephone number comprises a telephone number entered without a dialing prefix;
   said at least one particular reason comprising that the telephonic call cannot be successfully completed without specifying said dialing prefix; and
   said later-specified telephone number elements comprising said dialing prefix.

10. The system of claim 7, wherein:
    said originally-specified telephone number comprises a telephone number for which at least one telephone number digit is not correct;
    said at least one particular reason comprising that said at least one telephone number digit is not correct; and
    said later-specified telephone number elements comprising at least one correction to said at least one telephone number digit which is not correct.

11. The system of claim 7, wherein:
    said originally-specified telephone number comprises a telephone number which could have been used to successfully complete the intended telephonic call under a superseded dialing plan;

said at least one particular reason comprising that the superseded dialing plan has been superseded by a superseding dialing plan; and said later-specified telephone number elements comprising telephone number elements required, in combination with said originally-specified telephone number, to successfully complete the intended telephonic call in accordance with the superseding dialing plan.

12. The system of claim 7, wherein:

said originally-specified telephone number comprises a telephone number entered without an area code;

said at least one particular reason comprising that it is intentionally desired to have the user dial all calls so as to include an area code; and said later-specified telephone number elements comprising said area code.

13. A non-transitory computer-readable medium comprising a set of instructions executable by a computerized system for assisting a user with placing a telephonic call, said computer-readable medium comprising one or more instructions for:

a user specifying an originally-specified telephone number to place an intended telephonic call, which telephone number, as originally-specified, for at least one particular reason, cannot be used to successfully complete the intended telephonic call;

the user, after specifying the originally-specified telephone number, later specifying later-specified telephone number elements, including the possible deleting, ignoring or changing of part of said originally-specified telephone number and/or related dialing elements;

causing the telephonic call to be successfully signaled using said originally-specified telephone number in combination with said later-specified telephone number elements, without the user having to re-specify said originally-specified telephone number; and keeping said originally-specified telephone number in a redial memory of a device used to place said telephonic call, for purpose of said deleting, ignoring or changing and signaling, until the user initiates a brand new dialing effort to place a new telephonic call.

14. The computer-readable medium of claim 13, wherein:

said originally-specified telephone number comprises a telephone number entered without an area code;

said at least one particular reason comprising that the telephonic call cannot be successfully completed without specifying said area code; and said later-specified telephone number elements comprising said area code.

15. The computer-readable medium of claim 13, wherein:

said originally-specified telephone number comprises a telephone number entered without a dialing prefix;

said at least one particular reason comprising that the telephonic call cannot be successfully completed without specifying said dialing prefix; and said later-specified telephone number elements comprising said dialing prefix.

16. The computer-readable medium of claim 13, wherein:

said originally-specified telephone number comprises a telephone number for which at least one telephone number digit is not correct;

said at least one particular reason comprising that said at least one telephone number digit is not correct; and said later-specified telephone number elements comprising at least one correction to said at least one telephone number digit which is not correct.

17. The computer-readable medium of claim 13, wherein:

said originally-specified telephone number comprises a telephone number which could have been used to successfully complete the intended telephonic call under a superseded dialing plan;

said at least one particular reason comprising that the superseded dialing plan has been superseded by a superseding dialing plan; and said later-specified telephone number elements comprising telephone number elements required, in combination with said originally-specified telephone number, to successfully complete the intended telephonic call in accordance with the superseding dialing plan.

18. The computer-readable medium of claim 13, wherein:

said originally-specified telephone number comprises a telephone number entered without an area code;

said at least one particular reason comprising that it is intentionally desired to have the user dial all calls so as to include an area code; and said later-specified telephone number elements comprising said area code.

19. The method of claim 1, further comprising determining that the user has initiated a brand new dialing effort based on the number of digits changed by said later-specified telephone number elements, and/or whether said changes are to the area code or to another part of the telephone number.

20. The system of claim 7, wherein the number of digits changed by said later-specified telephone number elements, and/or whether said changes are to the area code or to another part of the telephone number, is used to determine that the user has initiated a brand new dialing effort.

21. The computer-readable medium of claim 13, wherein the number of digits changed by said later-specified telephone number elements, and/or whether said changes are to the area code or to another part of the telephone number, is used to determine that the user has initiated a brand new dialing effort.

* * * * *